United States Patent
Yu et al.

(10) Patent No.: US 9,372,035 B2
(45) Date of Patent: Jun. 21, 2016

(54) HEAT RECOVERY STORAGE DEVICE

(71) Applicants: Dung-Di Yu, Taoyuan County (TW); Yung-Neng Cheng, Taoyuan County (TW); Chia-Chih Yang, Taoyuan County (TW)

(72) Inventors: Dung-Di Yu, Taoyuan County (TW); Yung-Neng Cheng, Taoyuan County (TW); Chia-Chih Yang, Taoyuan County (TW)

(73) Assignee: INSTITUTE OF NUCLEAR ENERGY RESEARCH, Tiaan Village, Longtan, Taoyuan (TW)

( * ) Notice: Subject to any disclaimer, the term of this patent is extended or adjusted under 35 U.S.C. 154(b) by 176 days.

(21) Appl. No.: 14/051,465

(22) Filed: Oct. 11, 2013

(65) Prior Publication Data
US 2015/0101777 A1  Apr. 16, 2015

(51) Int. Cl.
*F28D 20/00* (2006.01)

(52) U.S. Cl.
CPC .... *F28D 20/0034* (2013.01); *F28D 2020/0078* (2013.01); *Y02E 60/142* (2013.01)

(58) Field of Classification Search
CPC  F28D 1/0213; F28D 21/0012; F28D 21/0014
USPC ............................................ 165/10, 110, 132
See application file for complete search history.

(56) References Cited

U.S. PATENT DOCUMENTS

| | | | | |
|---|---|---|---|---|
| 4,448,347 A * | 5/1984 | Dunstan | ......................... | 237/2 B |
| 4,529,032 A * | 7/1985 | Molitor | ......................... | 165/301 |
| 5,740,857 A * | 4/1998 | Thompson et al. | ............. | 165/47 |
| 7,965,929 B2 * | 6/2011 | Eberle | ............................ | 392/449 |
| 2013/0228309 A1 * | 9/2013 | Wood et al. | .............. | 165/104.22 |

* cited by examiner

*Primary Examiner* — Sarah McPartlin

(57) ABSTRACT

The present invention is to provide a heat recovery storage device, which includes a major container, a heat transfer machine mounted in the major container, and a thermostatic valve mounted on the heat transfer machine. And the heat transfer machine is used for conducting heat transfer directly to the water in the major container, thus the efficiency of recovery increases, and loss of heat decreases. Also, the water is not easily boiled during the heat recovery, and the maximum of water temperature can increases. In extended use of more than one device of the present invention, each of the major containers can be installed with or without a heat transfer machine as required. The bypass outgassing control is not needed during the heat recovery, and is performed when the water temperature in the containers reaches to the highest.

3 Claims, 2 Drawing Sheets

HEAT RECOVERY STORAGE DEVICE

BACKGROUND OF THE INVENTION

1. Field of the Invention

The present invention is related to a heat recovery storage device, especially to a heat recovery storage device with low cost, high safety and great effectiveness of heat transfer.

2. Description of Related Art

As shown in FIG. 1, a traditional heat recovery storage device comprises a container 10 with heat transfer media used for water purification and a heat transfer machine 20 mounted outside the container 10. The container has a hot water outlet 104 at a higher position, a hot water inlet 103 at a middle position, and a cool water inlet 101 and a cool water outlet 102 at lower positions. The heat transfer machine 20 has at least a cool-end entrance 201 connected through the cool water outlet 102, a hot-end exit 202 connected through the hot water inlet 103, a hot source entrance 203 connected through a waste heat source 4, used for importing waste heat, and a heat source exit 204 capable of exporting waste heat.

While operating, the heat transfer machine 20 imports heat of outer waste heat source 4 from the heat source entrance 203. At the same time, the water flowing out of the cool water outlet 102 of the container 10 gets from the cool-end entrance 201 into the heat transfer machine 20 through a pump M, in order to absorb the heat in the heat transfer machine 20 and then become hot water. Then, the hot water can flow outward from the hot-end exit 202 and flow into the container 10 through the hot water inlet 103. Accordingly, the hot water in the container 10 flows outward from the hot water outlet 104 for the needs of the outer part (batteries stack). After cooling down by the outer part applications, the hot water flows back to the container 10. However, such structural combination has some deficiencies below upon operation:

1. Since the heat transfer machine 20 is mounted outside the container 10, loss of heat could easily happen and thus the efficiency of heat recovery decreases.

2. Since the heat transfer machine 20 is mounted outside the container 10, pipes/tubes mounted and connected between the two components are required, which makes the whole device costs a lot and has large volume.

3. Since the heat transfer machine 20 and the connector 10 have pipes/tubes connected there between, the structure of the device is made to be complicated and not easily to be extended.

4. Long pathway of heat transfer makes excessive pressure loss of the low-temperature side, and the natural circulation is hard to form as well; compulsory circulation is required to avoid the cold-end exit overheated and extra power consumption that brings about poor performance.

Long pathway of heat transfer makes excessive pressure loss of the high temperature side and then results in excessive back pressure on the battery stack of the former-end fuel cells and the burner, such that the application is also limited.

In view of the aforementioned problems of the conventional heat recovery storage device, the inventor made efforts to improve the design and then the present invention is created.

SUMMARY OF THE INVENTION

The primary purpose of the present invention is to provide a heat recovery storage device, which has a built-in heat transfer machine plate that replaces a conventional heat transfer machine shell. By using the heat transfer machine sheet with small volume and low pressure loss, such built-in structural combination can improve the efficiency of the heat transfer.

Another purpose of the present invention is to provide a heat recovery storage device, which has a heat transfer machine sheet with low pressure loss mounted therein, such that the device can circulate naturally without a circulation pump and external tubes. There is no need of dissipation energy to store heat automatically, and thus the efficiency of SOFC (Solid Oxide Fuel Cell) can greatly improve. In addition, the design of low pressure loss diminishes the difficulty of the systematic front-end equipment due to the high back pressure, in order to improve the reliability of the equipment.

Another purpose of the present invention is to provide a heat recovery storage device, which uses the cold-end exit of the heat transfer machine to carry out bypass outgassing control, with which part of heat transfer can be performed in order to avoid boiling in portion of the device. The hot air can be totally isolated when reaching the default temperature, such that the heat transfer machine has great safety because it cannot be heated with any water. Accordingly, the depressurization valve is not required in the heat transfer machine, which makes the device cost low and the safety improved.

To achieve the purposes described above, the present invention is to provide heat recover storage device, which comprises a major container having a space for storing heat transfer media, an hot water outlet and an hot water inlet mounted on the surface of one side of the major container; a heat transfer machine mounted in the space of the major container, and having at least one hot source inlet extended outside the space and connected through a waste hot source.

In accordance with the present invention, the heat transfer machine further has a cold-end entrance and hot-end exit facing inward the space respectively. Preferably, the height from the hot-end exit to the bottom of the manifold thereof is ranging from 15 cm to 25 cm.

In accordance with the present invention, the at least one hot source inlet of the heat transfer machine is further connected to a condenser.

In accordance with the present invention, the condenser and the at least one hot source outlet of the heat transfer machine are respectively connected to a thermostatic valve, and the thermostatic valve carries out outgassing control through the temperature feedback of the hot source outlet of the heat transfer machine.

The structural combination, principles of applications, roles and effectiveness of the present invention will be well-understood with descriptions and the figures attached.

DETAILED DESCRIPTION OF THE PREFERRED EMBODIMENTS

Figure 1:
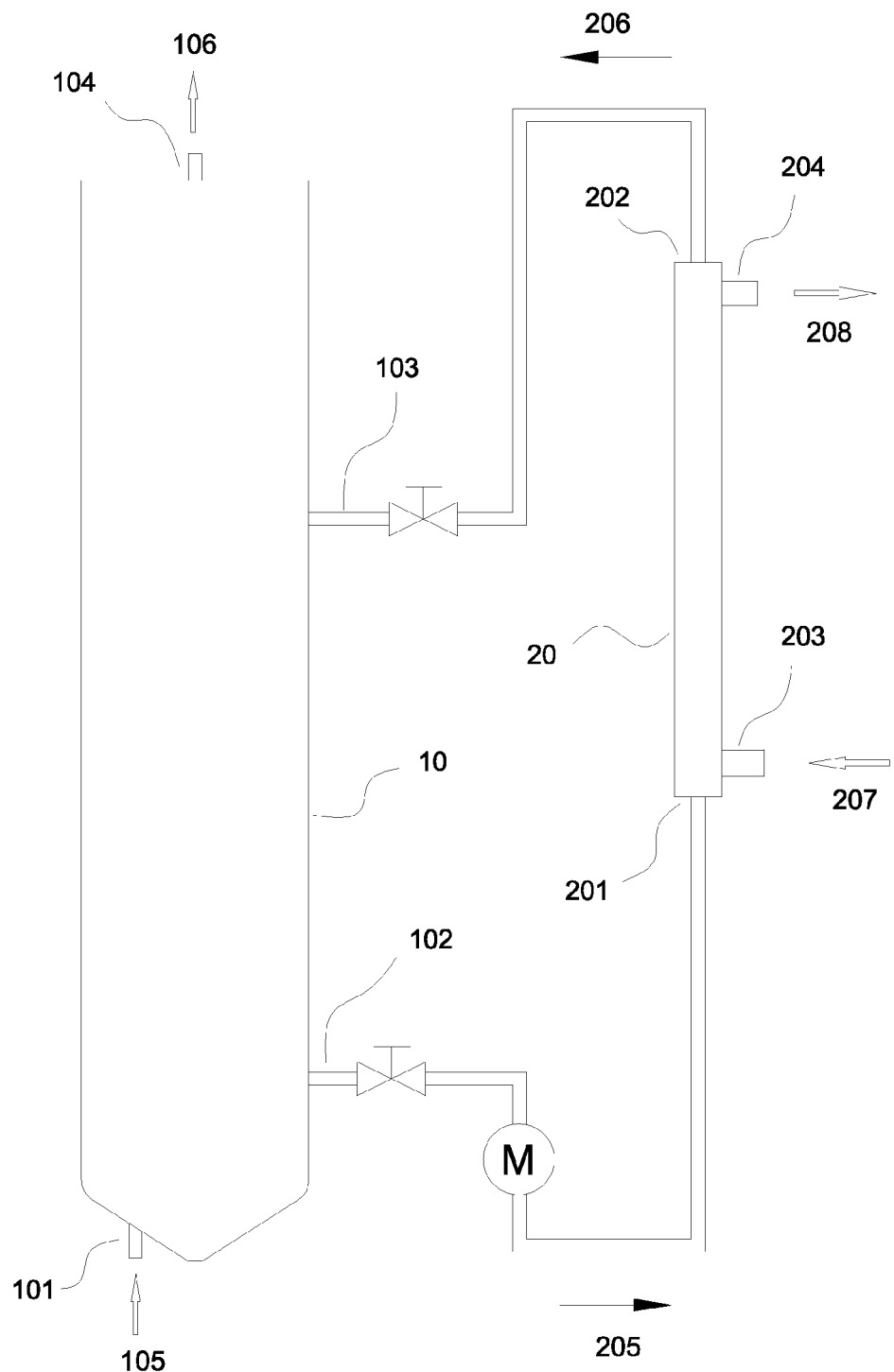
FIG. 1 is a schematic view of a conventional heat recovery storage device.
Figure 2:
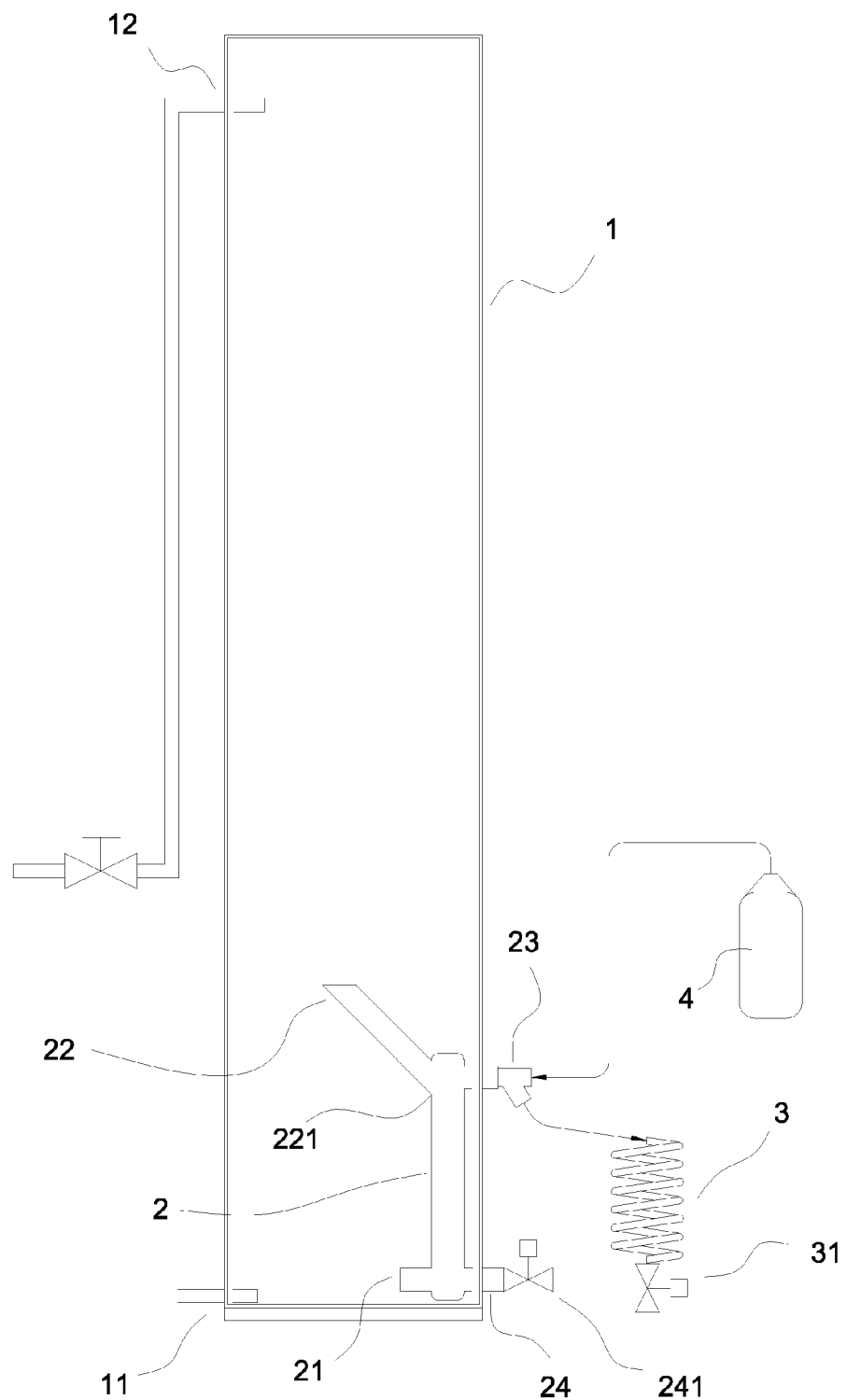
FIG. 2 is a schematic view of a heat recovery storage device according to the present invention.

With reference to FIG. 2, the heat recovery storage device according to the present invention comprises a major container 1, and a heat transfer machine 2. The major container has a space for storing heat transfer media, for example, water, a hot water outlet 12 at a high position and a hot water inlet 11 at a low position that are mounted on the surface of one side of the major container 1. The heat transfer machine 2 is mounted in an internal space of the major container 1.

Also, the heat transfer machine 2 has a hot source inlet 23 and a hot source outlet 24 extended outside the major container 1. The hot source inlet 23 is connected through an external waste hot source 4 and one end of a condenser 3. The other end of the condenser 3 has a thermostatic valve 31 mounted there on, and the hot source exit also has a thermostatic 241. The heat transfer machine 2 further has a cold-end entrance 21 used for the heat transfer media flowing inwardly and a hot-end exit 22 used for the heat transfer media flowing outwardly, which are both mounted in the part responding to the interior of the major container 1. In a preferred embodiment, the height from the hot-end exit 22 to the bottom of the manifold 221 thereof is ranging from 15 cm to 25 cm.

In operation, the heat transfer machine 2 introduces the heat from the external waste heat source 4 inwardly through the hot source inlet 23. A the mean time, the heat transfer media gets into the heat transfer machine 2 through the cold-end entrance 21, in order to absorb the waste heat introduced in the heat transfer machine 2 and become a fluid, for example, water, with high temperature. The fluid with high temperature flows back into the major container 1 through the hot-end exit 22, such that the temperature of the heat transfer media in the major container 1 gradually increases and resulting in a circulation with alternation flux of cold water and hot water. A temperature sensor (not shown) can be mounted on the hot source outlet 24 of the heat transfer machine 2 during the heat circulation, in order to detect the temperature of the hot source outlet 24 and further to make feedback control to the action of outgassing of the thermostatic valves 31 and 241 for heat removal, respectively, thereby controlling the heat transfer media in the major container 1 to keep precise working temperature.

Multiple major containers 1 can be interconnected together through the hot water outlet 12 and the cold water inlet 11 if any requirement. The major container 1 are interconnected in order to achieve better capacity of heat transfer and storage.

The present invention has following technical characteristics:

1. The heat transfer machine 2 of the device of present invention is designed to be mounted in the major container 1, so that external pipes/tubes can be excluded to save space, lower the costs, decrease heat loss and improve efficiency.

2. The thermostatic valves are simply used to carry out safe and efficient operation of heat recovery. The major container 1 and the heat transfer media perform the heat transfer well, let water not easily boiled and the maximum temperature of water is raised.

3. Since the structure of the device is simple and easily to achieve extension of modules. The heat transfer machine 2 can be installed or not in the modules. Bypass outgassing control is performed after each major container 1 reach to the maximum temperature.

4. Due to the simple structural combination and convenient operation of the device of the present invention, the device has low failure rate, low riskiness and wild application in heat recovery. Also, the device is low cost, safe and reliable, and thus good to be commercialized and highly acceptable to customers.

5. The device of the present invention can carry out natural circulation inside the container without additionally forcing to drive dissipation of energy, and thus to improve the economical effectiveness and benefit to environmental protection. The device also has low pressure loss at the hot end, which makes itself can be used in other devices with highly limited back pressure and widely applied in many aspects.

As the aforementioned description, the heat recovery storage device of the present invention definitely has low cost, improved efficiency of heat transfer and great safety. The present invention does possess the utility, novelty and non-obviousness.

Even though numerous characteristics and advantages of the present invention have been set forth in the foregoing description, the disclosure is illustrative only, not to limit the invention. Changes may be made in the details, and arrangement of parts within the principles of the invention to the full extent indicated by the broad general meaning of the terms in which the appended claims are expressed.

What is claimed is:

1. A heat recover storage device, comprising:
a major container having a space for storing heat transfer media, a hot water outlet and a hot water inlet mounted on a surface of one side of said major container;
a heat transfer machine mounted in said space of said major container, and having at least one hot source inlet extended outside said space and connected through a waste hot source, wherein said heat transfer machine further has a cold-end entrance and a hot-end exit facing inward said space respectively, and a height from said hot-end exit to a bottom of a manifold thereof is ranging from 15 cm to 25 cm.

2. The heat recovery storage device as claimed in claim 1, wherein said at least one hot source inlet of said heat transfer machine is further connected to a condenser.

3. The heat recovery storage device as claimed in claim 1, wherein said condenser and said at least one hot source inlet of said heat transfer machine are respectively connected to a thermostatic valve, and said thermostatic valve carries out outgassing control through a temperature feedback of said hot source outlet of said heat transfer machine.

* * * * *